United States Patent
Hillen

(10) Patent No.: US 10,828,783 B2
(45) Date of Patent: Nov. 10, 2020

(54) METHOD FOR OPERATING A SELF-TRAVELING ROBOT

(71) Applicant: Vorwerk & Co. Interholding GmbH, Wuppertal (DE)

(72) Inventor: Lorenz Hillen, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 276 days.

(21) Appl. No.: 16/034,523

(22) Filed: Jul. 13, 2018

(65) Prior Publication Data
US 2019/0015990 A1    Jan. 17, 2019

(30) Foreign Application Priority Data
Jul. 14, 2017   (DE) ................. 10 2017 115 847

(51) Int. Cl.
| | |
|---|---|
| *B25J 9/16* | (2006.01) |
| *A47L 9/28* | (2006.01) |
| *B25J 11/00* | (2006.01) |
| *G06F 8/65* | (2018.01) |
| *G06K 7/10* | (2006.01) |
| *G06K 7/14* | (2006.01) |
| *G06K 19/06* | (2006.01) |

(52) U.S. Cl.
CPC .......... *B25J 9/1697* (2013.01); *A47L 9/2857* (2013.01); *B25J 9/162* (2013.01); *B25J 11/0085* (2013.01); *G06F 8/65* (2013.01); *G06K 7/10722* (2013.01); *G06K 7/1417* (2013.01); *G06K 19/06037* (2013.01); *A47L 2201/04* (2013.01); *G05B 2219/45098* (2013.01)

(58) Field of Classification Search
CPC ...... B25J 9/162; B25J 11/0085; A47L 9/2857; A47L 2201/04; A47L 9/009; G06F 8/65; G06K 7/10722; G06K 7/1417; G06K 19/06037; G05B 2219/45098; G01S 7/481; G01S 17/48; G01S 17/931; G05D 1/0248; G05D 2201/0203
USPC .................................... 700/245, 253
See application file for complete search history.

(56) References Cited

U.S. PATENT DOCUMENTS

| | | | |
|---|---|---|---|
| 8,380,350 B2 * | 2/2013 | Ozick | B60L 1/003 700/253 |
| 8,874,261 B2 * | 10/2014 | Hein | G05D 1/024 700/245 |
| 8,918,208 B1 * | 12/2014 | Hickman | B25J 9/1697 700/253 |

(Continued)

FOREIGN PATENT DOCUMENTS

| | | |
|---|---|---|
| DE | 10 2008 014 912 A1 | 9/2009 |
| DE | 10 2011 000 536 A1 | 8/2012 |

*Primary Examiner* — Jaime Figueroa
(74) *Attorney, Agent, or Firm* — Collard & Roe, P.C.

(57) ABSTRACT

A method for operating a self-traveling robot, wherein a control command for initiating a service mode is transmitted to the robot, and wherein a service is made available for the robot in the service mode. In order to reliably and comfortably switch the robot into a service mode, an optical code containing the control command is displayed on an external terminal, wherein the optical code is detected by an image acquisition device of the robot, and wherein a control device of the robot extracts the control command from the optical code and initiates the corresponding service mode.

9 Claims, 3 Drawing Sheets

(56) References Cited

U.S. PATENT DOCUMENTS

| | | | | |
|---|---|---|---|---|
| 8,935,006 | B2* | 1/2015 | Vu | G06N 3/008 |
| | | | | 700/264 |
| 9,229,454 | B1* | 1/2016 | Chiappetta | G05D 1/0225 |
| 9,656,390 | B2* | 5/2017 | Telling | B25J 9/161 |
| 9,682,481 | B2* | 6/2017 | Lutz | B25J 9/1697 |
| 9,896,315 | B2* | 2/2018 | High | G01S 1/7034 |
| 10,286,547 | B2* | 5/2019 | Takaichi | B25J 13/06 |
| 10,399,230 | B2* | 9/2019 | Shah | G06Q 10/087 |
| 10,657,802 | B2* | 5/2020 | Guerin | G05B 19/409 |
| 10,671,088 | B2* | 6/2020 | Lutz | B25J 5/007 |
| 2006/0184013 | A1* | 8/2006 | Emanuel | G01S 5/16 |
| | | | | 600/426 |
| 2006/0241812 | A1* | 10/2006 | Jung | G05D 1/0044 |
| | | | | 700/254 |
| 2015/0134115 | A1* | 5/2015 | Gong | B25J 9/1656 |
| | | | | 700/259 |
| 2015/0301588 | A1* | 10/2015 | Jeong | G06F 1/3218 |
| | | | | 713/323 |

* cited by examiner

METHOD FOR OPERATING A SELF-TRAVELING ROBOT

CROSS REFERENCE TO RELATED APPLICATIONS

Applicant claims priority under 35 U.S.C. § 119 of German Application No. 10 2017 115 847.2 filed Jul. 14, 2017, the disclosure of which is incorporated by reference.

BACKGROUND OF THE INVENTION

1. Field of the Invention

The invention pertains to a method for operating a self-traveling robot, wherein a control command for initiating a service mode is transmitted to the robot, and wherein a service is made available for the robot in the service mode.

The invention also pertains to a self-traveling robot, particularly a cleaning robot, with an image acquisition device.

The invention furthermore pertains to a system consisting of a self-traveling robot with an image acquisition device, an external terminal for displaying an optical code and an external service device for making available a service for the robot.

2. Description of the Related Art

Self-traveling robots are known from the prior art in a variety of different designs. They may be realized, for example, in the form of floor treatment robots, particularly cleaning robots such as vacuuming robots and/or wiping robots. However, these robots may also be realized in the form of transport robots, lawnmowing robots or the like.

The robots are preferably equipped with a sensor system in order to detect obstacles in the environment. For example, a robot may feature a distance measuring device on the basis of ultrasonic waves or light waves, by means of which distances from obstacles can be measured. An environment map and/or a traveling route can then be generated based on the measured distance data in order to allow a progressive motion of the robot in the environment without a collision with obstacles.

Publications DE 10 2011 000 536 A1 and DE 10 2008 014 912 A1 describe apparatuses for cleaning floors that are realized, for example, in the form of vacuuming and/or cleaning robots.

Such robots are usually switched into a service mode by inputting a certain key combination on a keypad or a touchscreen of the robot. It is furthermore known to realize a service mode, e.g. for the purpose of installing new apparatus software, with the aid of a physical storage medium that is connected to the robot.

Although the aforementioned methods basically proved successful in the prior art, it may still be inconvenient for a user to activate the service mode by means of a key input on the robot or by having to produce a physical connection between the robot and a storage medium.

SUMMARY OF THE INVENTION

Based on the described prior art, the invention is therefore based on the objective of conveniently initiating and realizing a service mode of the robot.

In order to attain the above-defined objective, the invention proposes that an optical code containing the control command is displayed on an external terminal, wherein the optical code is detected by means of an image acquisition device of the robot, and wherein a control device of the robot extracts the control command from the optical code and initiates the corresponding service mode.

According to the invention, the control command for initiating the service mode is now integrated into an optical code that can be read from an external terminal by an image acquisition device of the robot. For example, the image acquisition device may be a camera or a camera chip such as a CCD chip or CMOS chip. The external terminal is preferably a mobile terminal, particularly a mobile telephone, a tablet computer, a laptop or the like. The optical code is preferably shown on a display of the external terminal, wherein a user holds the external terminal in front of the image acquisition device of the robot in such a way that this image acquisition device can detect the optical code. The external terminal may, in principle, also be a device that merely serves for initiating the service mode and features an optical code on a display or, according to a particularly simple embodiment, on an upper side of a housing or the like. The optical code may also be permanently arranged on a surface. In this context, the external terminal may, for example, also consist of a mere code card that is held in front of the image acquisition device of the robot by the user or a service technician. In all above-described instances, the optical code may consist, for example, of a QR code, a barcode, multicolored mosaic graphics known as so-called photoTAN in online banking or another code with a pattern. All in all, the robot can therefore be switched into the service mode without direct key input on the robot or other physical handling of the robot in order to perform predefined service activities in this service mode.

A code designed especially for initiating a service mode also makes it possible to ensure that a service technician is not granted access to personal data of the user of the robot, which is stored in the robot or in an external memory connected to the robot via a communication link. In autonomously operating robots, particularly IoT (Internet of Things) apparatuses, a customer account is usually associated with a certain apparatus or robot. For this purpose, a link between a username and a unique apparatus identifier such as a MAC address or a serial number is established, for example in a customer database. The robot is then associated with a customer account, for example, by transmitting account information to the robot by means of an external device, particularly a mobile terminal with a corresponding application, during a configuration step, wherein the robot in turn uses the account information and the apparatus identifier for transmitting an association inquiry to an external service device, for example a web server of the robot manufacturer. In addition to the association with a certain customer account, personal data and settings, e.g. access information to a WLAN network of the customer or passwords, are frequently also stored in the robot or in the customer database, respectively. If a robot associated with such a customer account is handed over to a service technician for repair and/or service purposes, it should be ensured that no customer settings are lost and no access to sensible customer data takes place due to the service being performed. The inventive initiation of the service mode by means of an optical code makes it possible to activate the service mode in such a way that customer data and/or customer settings are hidden and only special commands or operations, which are preferably not accessible by a user, are made available to the service technician. Access rights for the user and access rights for the service technician particularly separated from one another. Two configuration areas preferably exist simultaneously, namely a standard area for customer data on the one hand and a protected memory area for the service mode on the other hand. During a normal working mode of the robot, in which this robot performs, e.g., a cleaning task, only the configuration area for the customer data is accessible. The configuration area for the service mode is preferably encoded. The release of the configuration area is realized by detecting, authenticating, decoding and identifying the aforementioned optical code. When the robot detects a corresponding valid optical code, the service mode is initiated and the configuration area containing the customer data is hidden and/or encoded. This can be achieved, for example, with temporary encoding realized by utilizing the apparatus identifier and a time stamp. As soon as the service mode is concluded, the normal configuration area containing the customer data is released again and the service mode configuration area is in turn hidden or encoded.

A user of the robot can store, for example, network information, customer account information, environment maps of an environment to be cleaned, if applicable, together with corresponding information on dirt accumulations, cleaning schedules, customer-specific apparatus settings or the like in the configuration area for the customer data. The configuration area for the service mode may contain, for example, an URL of an external service device, network information for the service mode, a program code for a service activity or the like.

A service made available in the service mode of the robot may include predefined commands and/or operations for a service technician, for example resetting the robot to a factory setting, starting a self-diagnosis, deleting or adding a network connection, transmitting status information or a LOG file to an external service device (e.g. to a service cloud), performing a firmware update or the like.

Typically used optical codes not only allow the encoding of a command and associated additional information, e.g. URLs, but also the integration of a digital signature, e.g. cryptographic hash functions and/or public-key signatures. The digital signature makes it possible to verify if a code is valid for the robot. The service mode is only started if the code is valid, but not otherwise.

It is furthermore proposed that a command for generating an optical code is transmitted to the external terminal in order to initiate the service mode. For example, a service technician utilizes an application installed on the external terminal for this purpose. The application may initially make available an option for selecting one of multiple potential service modes. If applicable, an identifier to be integrated into the optical code in addition to the command for initiating the desired service mode, for example a signature, a hash function, a random number or the like, is generated after the selection of the desired service mode. During the evaluation of the optical code, the identifier is used for verifying the code, wherein the optical code is only accepted by the robot if it is determined to be a valid code. Furthermore, information on a service technician, for example the technician's name, can also be integrated into the optical code. In the context of a rights management system, this makes it possible to ensure that only certain persons can carry out certain commands. Alternatively, information on which person has carried out which command at what time may be stored in a database of the robot or an external service device.

It is furthermore proposed that the service mode includes the robot transmitting an activity protocol to an external service device and/or the external terminal or requesting a software update from an external service device. The activity protocol includes a recording of performed activities and/or processes of the robot in the form of a so-called LOG file. The software update may particularly concern a firmware update that is performed during the course of a so-called OTS (over the air) update.

According to a particularly preferred embodiment, it is proposed that the external terminal generates an identifier that is only valid for a predefined time period, wherein the identifier is on the one hand integrated into the optical code displayed on the external terminal and on the other hand transmitted to an external service device, particularly a web server. The identifier, which is valid for a predefined time period, is a one-time identifier of the type known, for example, as a so-called security token/software token, which is frequently used for making available a service for a limited time period and/or for identifying the user of an identifier. For example, the one-time identifier is generated on the external terminal that also displays the optical code by a random generator. The one-time identifier is transmitted to the robot (due to its integration into the optical code), as well as to the external service device.

It would particularly be conceivable that the robot transmits an activity protocol and the identifier transmitted by the external terminal to the external service device, wherein the external service device checks if the identifier is valid and transmits the activity protocol to the external terminal if the identifier is determined to be valid. When the robot transmits an activity protocol (e.g. LOG data) to the external service device, a one-time code valid for a limited time period is transmitted to the external service device by the robot, whereupon the external service device checks if the one-time code is still used within the defined time period.

It would furthermore be conceivable that the robot transmits a request for an update of software, particularly firmware, installed on the robot and an identifier transmitted by the external terminal to the external service device, wherein the external service device checks if the identifier is valid and transmits the software update to the robot if the identifier is determined to be valid.

It would ultimately also be conceivable that the service mode is concluded in a time-controlled fashion by restarting the robot or by detecting an optical code containing a corresponding control command. After the conclusion of the service mode, a user can once again use the robot in a working mode. In this case, the normal configuration area containing the customer data is once again released and the service mode configuration area is hidden or encoded.

In addition to the above-described method, the invention also proposes a self-traveling robot, particularly a cleaning robot, with an image acquisition device, wherein the robot is designed for carrying out an above-described method.

Furthermore, a system consisting of a self-traveling robot with an image acquisition device, an external terminal for displaying an optical code and an external service device for making available a service for the robot is proposed, wherein the robot is designed for carrying out an above-described method.

Characteristics described above with reference to the inventive method, as well as advantages achieved thereby, also apply to the inventive robot and the inventive system. For example, the robot may be a floor treatment robot, particularly a cleaning robot such as a vacuuming robot and/or wiping robot. However, these robots may also be realized in the form of transport robots, lawnmowing robots or the like. The external terminal may be a mobile terminal such as a mobile telephone, a tablet computer, a laptop or the like, but may also be a mere code card or a device that carries a permanent optical code on one surface. The external service device is preferably a server, to which the robot and preferably also the external terminal are communicatively linked. The external service device may particularly be a web server of the robot manufacturer.

BRIEF DESCRIPTION OF THE DRAWINGS

The invention is described in greater detail below with reference to exemplary embodiments. In the drawings.

DETAILED DESCRIPTION OF THE PREFERRED EMBODIMENTS

Figure 1:
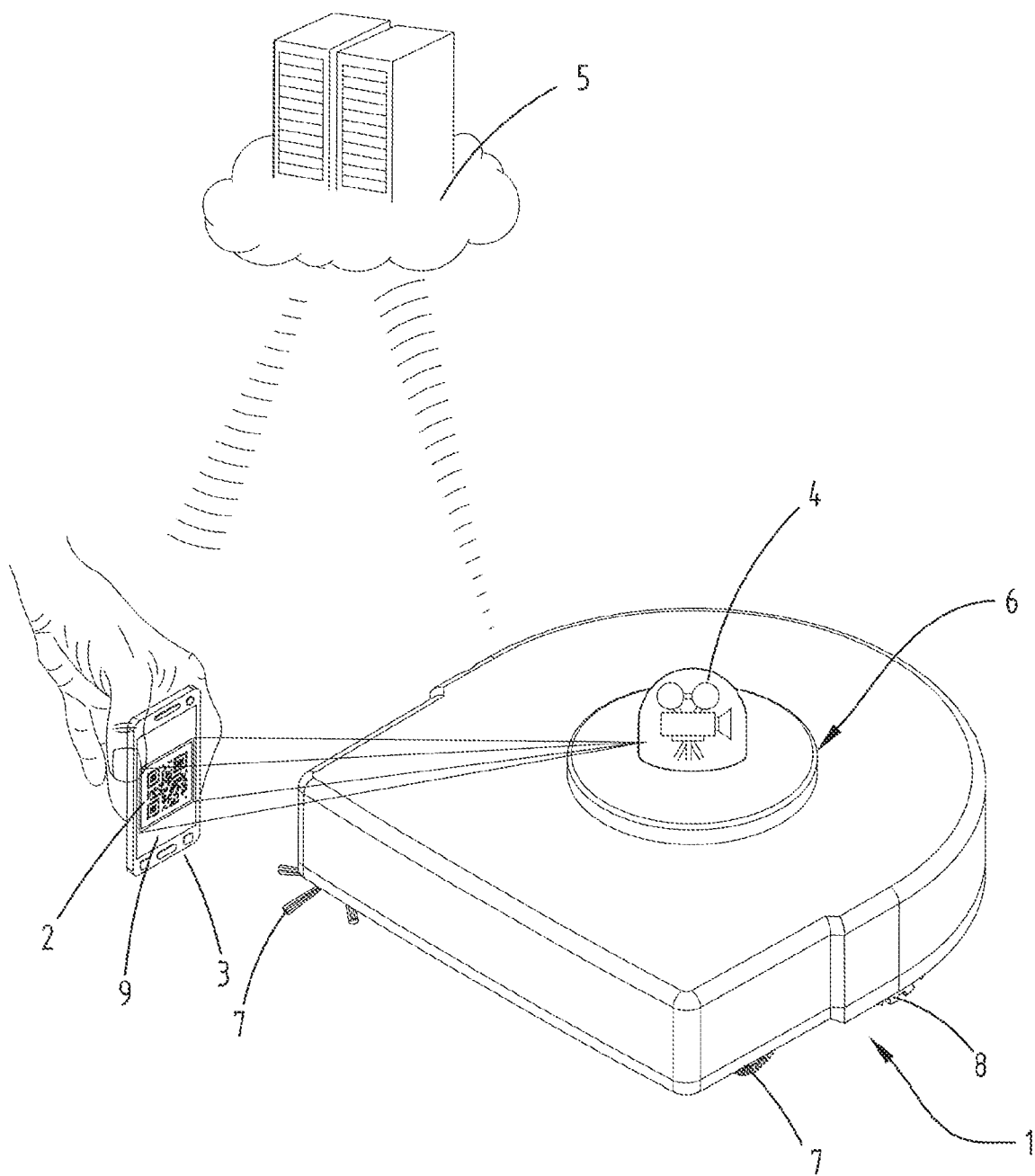
FIG. 1 shows a system consisting of a robot, an external terminal and an external service device.

FIG. 1 shows a system consisting of a robot 1, an external terminal 2 and an external service device 5.

In this case, the robot 1 is realized in the form of a self-traveling vacuuming robot with motor-driven wheels 8, by means of which the robot can travel within an environment. The robot 1 also features cleaning elements 7, namely a lateral brush 7 and a bristle roller that serve for acting upon a surface to be cleaned. In the region of the cleaning elements 7, the robot 1 has a not-shown suction mouth opening, through which air containing material to be vacuumed up can be sucked into the robot 1 by means of the motor-blower unit. The robot 1 is equipped with a not-shown rechargeable battery for the electric power supply of the individual electrical components of the robot 1 such as the drive for the wheels 8 and the cleaning elements 7, as well as additionally provided electronics. The robot 1 is furthermore equipped with a distance measuring device 6, which in this case features, e.g., a triangulation measuring device. The distance measuring device 6 measures distances from obstacles and walls within the environment of the robot 1. The distance measuring device 6 specifically features a laser diode, the emitted light beam of which is guided out of a housing of the robot 1 by means of a deflection device and rotatable about a vertical axis of rotation in the orientation of the robot 1 shown, particularly with a measuring angle of 360 degrees. An all-around distance measurement about the robot 1 can thereby be achieved. The distance measuring device 6 makes it possible to survey the environment of the robot 1 in a preferably horizontal plane, i.e. in a plane extending parallel to the surface to be cleaned. In this way, the robot 1 can travel within the environment while avoiding a collision with obstacles and walls. The measuring data recorded by means of the distance measuring device 6, which represents distances from obstacles and/or walls in the environment, is used for generating an environment map of the environment. This environment map can be stored in a local memory of the robot 1 or in a memory of the external service device 5. Furthermore, the robot 1 may feature, e.g., a not-shown odometry sensor that measures the distance traveled by the robot 1. It would also be conceivable, for example, to provide the robot 1 with contact sensors or the like. The robot 1 furthermore features an image acquisition device 4, in this example a camera. The image acquisition device 4 records digital images of the environment, which can be evaluated by a computer unit assigned to the image acquisition device 4 with the aid of a corresponding digital image processing program.

In this example, the external terminal 3 is a mobile telephone, namely a smartphone with a display 9. An optical code 2 is shown on the display 9 of the terminal 3 and can be detected and read out by means of the image acquisition device 4 and the computer unit of the robot 1.

In this case, the external service device 5 is a web server that is made available in the Internet by the manufacturer of the robot 1. A wireless communication link is established between the external terminal 3 and the external service device 5, as well as between the robot 1 and the external service device 5.

Figure 2:
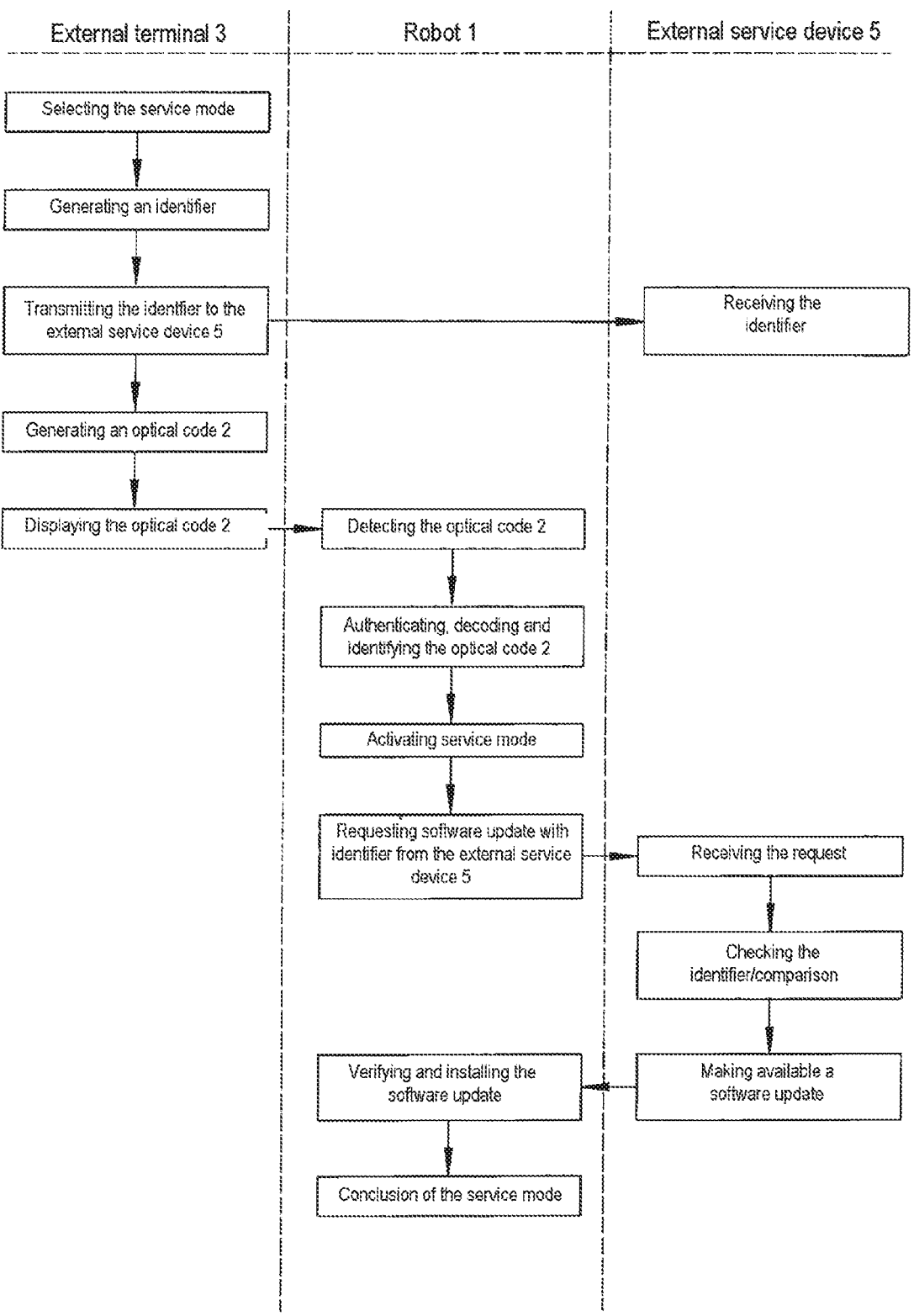
FIG. 2 shows a flow chart of an inventive method according to a first embodiment.
Figure 3:
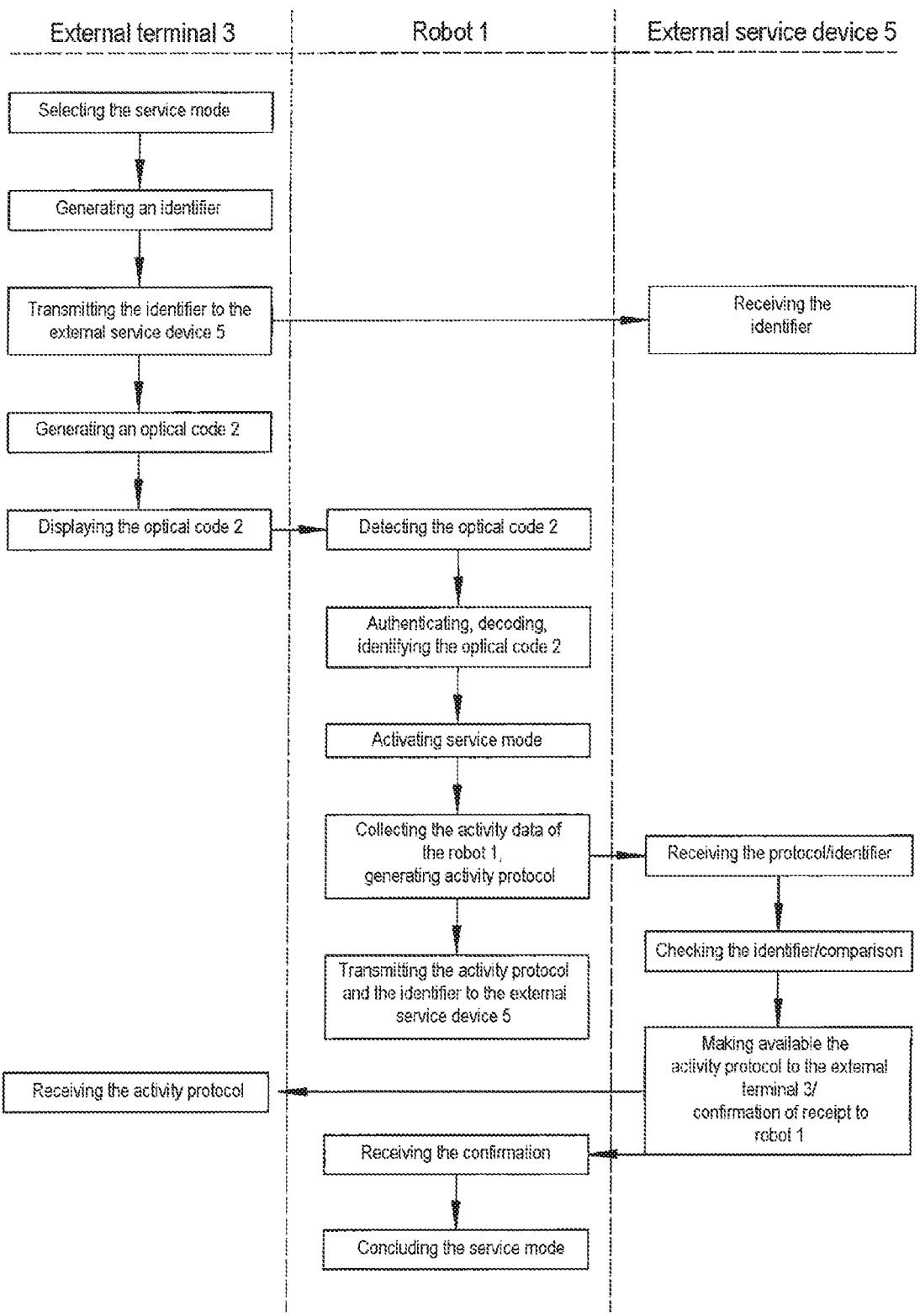
FIG. 3 shows a flow chart of an inventive method according to a second embodiment.

FIGS. 2 and 3 show exemplary flow charts for two different embodiments of a method for operating the system illustrated in FIG. 1.

FIG. 2 concerns a method, in which software of the robot 1, e.g. firmware, is updated. In this case, the method includes an OTA (over the air) update. The firmware update is initiated by means of external terminal 3, which may be a terminal 3 of a user of the robot 1 or a terminal 3 of a service technician.

For example, a service technician initially selects a service mode suitable for performing a software update by means of an application installed on the terminal 3. Subsequently, the application generates an identifier, which identifies the optical code 2 as a valid code for the robot 1, by means of a random generator. In this example, the identifier is a one-time code consisting of a hash function, a random number and the name of the service technician performing the update. The application installed on the terminal 3 subsequently generates the optical code 2, which consists of a QR code in this case. The optical code 2 contains the command for initiating the desired service mode, namely for performing the software update, as well as the generated identifier. Furthermore, the optical code 2 may also contain optional information such as WLAN access data, an URL of the external service device 5 and/or an activity number, e.g. a ticket number, for assigning the robot 1 to a service activity. The generated identifier as such is also transmitted from the terminal 3 to the external service device 5. The transmission may be realized by means of a retrieved URL. It would furthermore be conceivable that information on a version of the requested software update, information regarding a user group or user rights and/or an activity number is also transmitted to the external service device 5.

The generated optical code 2 is shown on the display 9 of the terminal 3. The terminal 3 is subsequently held in front of the robot 1 in such a way that the display 9 of the terminal 3 is located within the detection range of the image acquisition device 4 of the robot 1. The image acquisition device 4 detects the optical code 2, which is subsequently authenticated, decoded and identified by means of the computer unit of the robot 1. The command for performing the software update contained in the optical code initiates the selected service mode. The identifier, which is likewise contained in the optical code 2, is transmitted to the external service device 5 together with a request for making available the software update. The request may contain additional information on a version of the software update, an apparatus ID of the robot 1 such as a MAC address or a serial number, an activity number or a selected service mode. The external service device 5 receives the request of the robot 1 and, if applicable, additional information that controls the processing of the activity. In addition, the external service device 5 may define a timeout, which defines the time up to the reception of the request of the robot 1 after the reception of the identifier from the external terminal 3. The external service device 5 compares the identifier transmitted by the robot 1 with the identifier transmitted by the external terminal 3. If these identifiers correspond, the external service device 5 transmits the new software version, particularly so-called software images, to the robot 1. The software version is then verified and installed in the robot. If applicable, the robot 1 may in response transmit a confirmation message, which confirms the successful reception and verification, to the external service device 5. The service mode is subsequently concluded by restarting the robot 1.

FIG. 3 concerns a method, in which an activity protocol of the robot 1, namely a LOG file, is respectively transmitted to an external service device 5 and from there to an external terminal 3. The external terminal 3 may once again be a terminal 3 of a user of the robot 1 or a terminal 3 of a service technician. In this case, it is assumed that the external terminal 3 is a terminal of a service technician.

The service technician initially selects a service of mode suitable for requesting an activity protocol by means of an application installed on the terminal 3. Subsequently, the application generates an identifier, which identifies the optical code 2 as a valid code for the robot 1, by means of a random generator. In this example, the identifier is a one-time code consisting of a hash function, a random number and the name of the service technician performing the update. The application installed on the terminal 3 subsequently generates the optical code 2, which consists of a QR code in this case. The optical code 2 contains the command for initiating the desired service mode, namely for generating the activity protocol, as well as the generated identifier. Furthermore, the optical code 2 may also contain optional information such as WLAN access data, an URL of the external service device 5 and/or an activity number, e.g. a ticket number, for assigning the robot 1 to a service activity. The generated identifier as such is also transmitted from the terminal 3 to the external service device 5. The transmission may be realized by means of a retrieved URL. It would furthermore be conceivable that additional information regarding a user group or user rights and/or an activity number is also transmitted to the external service device 5.

The generated optical code 2 is shown on the display 9 of the terminal 3. The terminal 3 is subsequently held in front of the robot 1 in such a way that the display 9 of the terminal 3 is located within the detection range of the image acquisition device 4 of the robot 1. The image acquisition device 4 detects the optical code 2, which is subsequently authenticated, decoded and identified by means of the computer unit of the robot 1. The command for generating an activity protocol contained in the optical code activates the selected service mode. A computer unit of the robot 1 collects the activity data of the robot 1 and generates an activity protocol. Subsequently, the generated activity protocol is transmitted to the external service device 5 together with the identifier extracted from the optical code 2. The external service device 5 receives the activity protocol and the identifier and compares the identifier received from the robot 1 with the identifier received previously from the external terminal 3. If the identifiers correspond, the external service device 5 makes the received activity protocol available for retrieval by the external terminal 3 or transmits the activity protocol to the external terminal 3. The external service device 5 transmits a confirmation of receipt to the robot 1. Subsequently, the service mode of the robot 1 is concluded, for example, by restarting the robot 1.

LIST OF REFERENCE SYMBOLS

1 Robot
2 Optical code
3 External terminal
4 Image acquisition device
5 External service device
6 Distance measuring device
7 Cleaning element
8 Wheel
9 Display

What is claimed is:

1. A method for operating a self-traveling robot, comprising the following steps:
    displaying an optical code on an external terminal, the optical code containing a control command for initiating a service mode of the robot,
    detecting the optical code with an image acquisition device of the robot,
    extracting with a control device of the robot the control command from the optical code,
    initiating the corresponding service mode with the control device, and
    making available a service for the robot in the service mode,
    wherein the robot can be operated in a working mode and in the service mode, and wherein the robot can be switched from the working mode into the service mode with a defined command contained in the optical code,
    further comprising the steps of transmitting an identifier from the external terminal to the robot in the optical code, wherein the identifier comprises a digital signature that makes it possible to verify if the optical code is valid for the robot, comparing the transmitted identifier with a defined identifier stored in a memory of the robot or an external service device that is communicatively linked to the robot, and releasing the service mode only if the transmitted identifier corresponds to the defined identifier.

2. The method according to claim 1, wherein a command for generating the optical code is transmitted to the external terminal in order to initiate the service mode.

3. The method according to claim 1, wherein the service mode includes the robot transmitting an activity protocol to an external service device and/or the external terminal or requesting a software update from an external service device.

4. The method according to claim 1, further comprising the step of generating with the external terminal an identifier that is only valid for a predefined time period, wherein the identifier is integrated into the optical code displayed on the external terminal and transmitted to an external service device.

5. The method according to claim 1, wherein the robot transmits an activity protocol and the identifier transmitted by the external terminal to the external service device, wherein the external service device checks if the identifier is valid and transmits the activity protocol to the external terminal if the identifier is determined to be valid.

6. The method according to claim 1, wherein the robot transmits a request for an update of software installed on the robot and an identifier transmitted by the external terminal to the external service device, wherein the external service device checks if the identifier is valid and transmits the software update to the robot if the identifier is determined to be valid.

7. The method according to claim 1, further comprising the step of concluding the service mode in a time-controlled fashion by restarting the robot or by receiving an optical code containing a corresponding control command.

8. A self-traveling robot, comprising:
an image acquisition device configured for detecting an optical code displayed on an external terminal, the optical code containing a control command for initiating a service mode of the robot; and
a control device configured for extracting the control command from the optical code, and initiating the corresponding service mode with the control device;
wherein the robot is configured to be operated in a working mode and in the service mode, and wherein the robot is configured to be switched from the working mode into the service mode with a defined command contained in the optical code
wherein the robot is further configured to transmit an identifier from the external terminal to the robot in the optical code, wherein the identifier comprises a digital signature that makes it possible to verify if the optical code is valid for the robot, and compare the transmitted identifier with a defined identifier stored in a memory of the robot or an external service device that is communicatively linked to the robot, and release the service mode only if the transmitted identifier corresponds to the defined identifier.

9. A system comprising the self-traveling robot according to claim 8 and an external terminal configured for generating and displaying the optical code.

* * * * *